July 10, 1951 L. S. PENNINGER 2,560,302
BAIT HOOK AND COMPLEMENTAL GAFF HOOKS
Filed Dec. 30, 1949
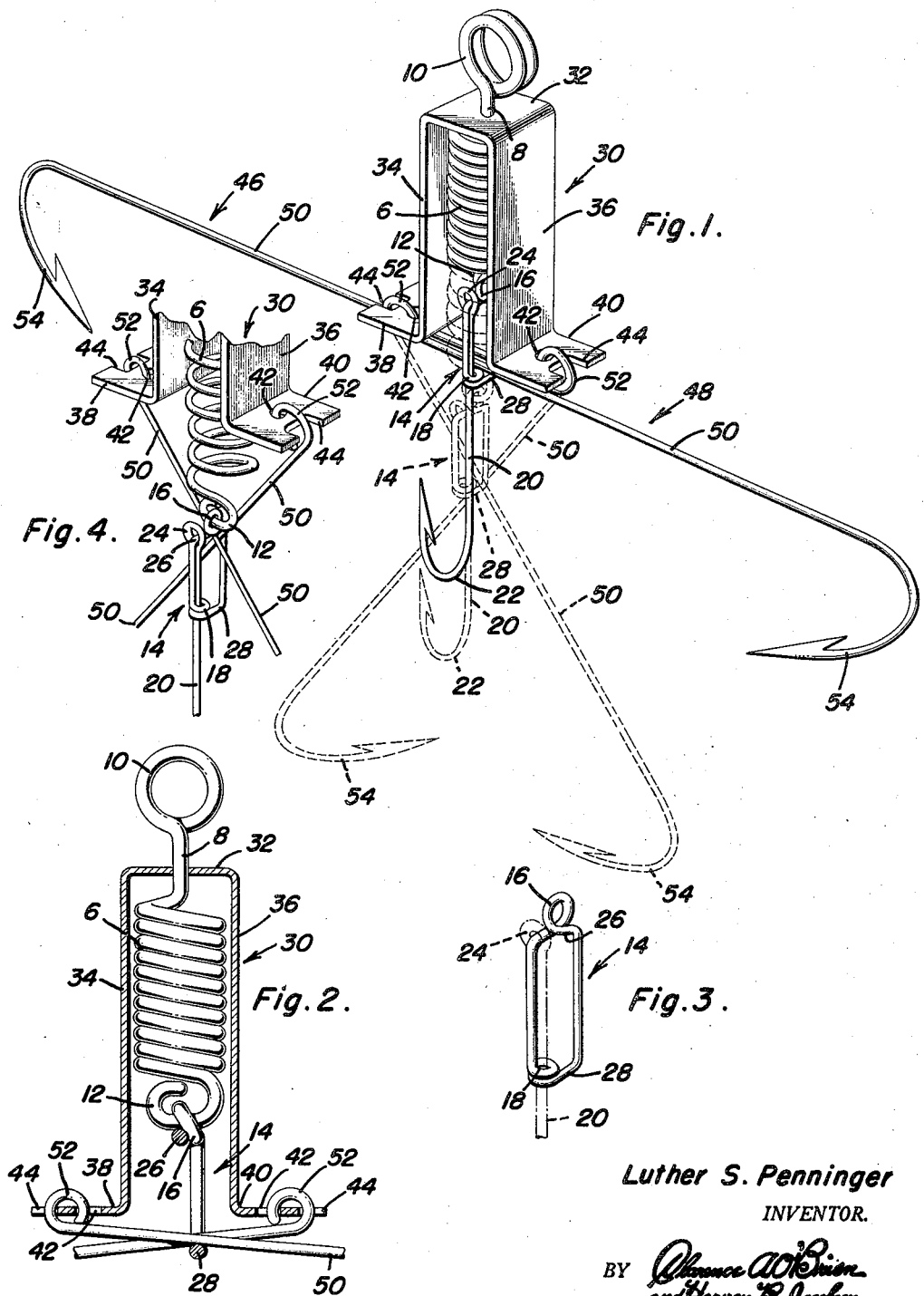
Luther S. Penninger
INVENTOR.

Patented July 10, 1951

2,560,302

UNITED STATES PATENT OFFICE 2,560,302

BAIT HOOK AND COMPLEMENTAL GAFF HOOKS

Luther S. Penninger, Raleigh, N. C.

Application December 30, 1949, Serial No. 135,934

4 Claims. (Cl. 43—34)

The present invention relates to an angler's hook construction wherein the over-all assemblage is characterized by a suitably centered bait carrying hook and complemental pull actuated gaff hooks and the principal object of the invention is to structurally, functionally and otherwise improve on fishhook constructions in the so-called trap hook field.

It is a matter of common knowledge to those skilled in the art to which the invention relates that the category of inventions which have been conveniently classified as "trap hooks" is made up of many and varied styles and forms of fishing hooks. It is admittedly old in this line of endeavor to employ a plurality of expanding trap hooks of the pull actuated type. In most instances, the essential element is the bait hook which latter is taken by the fish and which serves to trip or otherwise release the gaff hooks.

Briefly summarized, the instant invention has to do with a coiled spring, a bait hook, novel link means operatively joining the shank of the bait hook to an end of the coiled spring, a mount in which the coiled spring is housed, and especially constructed and arranged gaff or grappling hooks which are pivotally mounted on and controlled by the action of the link means.

In reducing to practice a preferred embodiment of the over-all construction, I have evolved and produced a simple and practical structure in which, it is believed, manufacturers and users will find their most desired needs fully met, contained and conveniently available.

More specifically, novelty is predicated on a link which serves to mechanically join an assembled bait hook on a coiled spring, said link having the additional function of a gaff resetting and retaining member and, in addition, a gaff tripping and thrust producing member.

In addition to the above, novelty is predicated on the mounting, which takes the form of a U-shaped frame, and is attachable to the end of the fishing line and which serves as an excellent carrier and mount for the spring, link, bait hook and, in addition, a practical support for the diametrically opposite long range gaff hooks.

Other objects and advantages will become more readily apparent from the following description and the accompanying illustrative drawings.

In the accompanying sheet of drawings, wherein like numerals are employed to designate like parts throughout the views:

Figure 1 is a perspective view of a bait hook and complemental gaff hooks constructed in accordance with the present invention showing the normal relationship of parts in full lines and partly projected positions in dotted lines.

Figure 2 is an enlarged fragmentary view, partly in section and partly in elevation, illustrating certain of the particulars.

Figure 3 is a perspective view of the novel trip link with bait hook appearing in dotted lines.

Figure 4 is a fragmentary perspective view based on Figure 1 showing the stage of operation wherein the pull actuated link is shown exerting a thrust pressure on the gaff hooks.

Referring now to the drawings and particularly to Figure 2, the coiled spring is denoted by the numeral 6 and has its uppermost convolution extended into a shank 8 terminating in a line eye 10 to which the fishing line (not shown) is connected. The lowermost convolution is formed into an adapter hook 12 which serves to accommodate a resetting and trip link 14. The latter is suitably elongated and is provided at its upper end with an attaching eye 16 which is releasably connected with the adapter hook 12 and provided at its lower end with an assembling eye 18 through which the shank 20 of the bait hook 22 is passed. The eye 24 on the shank is anchored on the upper transverse end portion 26 of the trip link 14. The lower transverse end portion, the trip proper, is denoted by the numeral 28.

The means for assembling and pivotally mounting the gaff hook takes the form of a frame 30 which is a U-shaped flat metal strap having a bight portion 32 and spaced parallel arms or sides 34 and 36 respectively. The arms are of duplicate construction and have their free ends fashioned into outstanding laterally disposed terminals 38 and 40. Each terminal is the same in construction and includes an aperture 42 and has a notch 44 in its free end portion.

The gaff hooks are denoted by the numerals 46 and 48 respectively. Each hook has an elongated limb portion 50 with an eye 52 at one end and a barbed hook 54 at the opposite snaring end. These limbs are disposed in crossed relation as shown in the drawings and the eyes 52 are attached to the coacting apertured terminals 38 and 40 respectively, as best shown in Figure 2. Under normal circumstances when the grappling or gaff hooks 46 and 48 are in readiness to act they are in approximate axial alignment with each other and at right angles to the axis of the spring 6 and frame 30. This is the position which they have in Figures 1 and 2. As best shown in Figure 2 the link 14 acts as a sort of stirrup and the spring 6 pulls the link up into the frame 30 and in turn saddles itself around the crossed portions or limbs of the gaff hooks, thus causing them to take the ready-to-function position shown in full lines in Figures 1 and 2.

In practice when the bait hook 20 is pulled by the fish, it exerts a downward pull on the link 14 causing it to extend beyond the frame 30 and to put the spring 6 under tension. The intermediate position of the bait hook, link and gaff hooks is shown in dotted lines in Figure 1. The stirrup portion of the link 14 serves to do the lifting and opening of the gaff hooks 46 and 48 and when some four or five pounds pressure is exerted on the bait hook 22 the upper transverse portion 26 of the link comes into play, functions as a thrust element and lodges itself in the "crotch" provided by the crossed limbs 50—50 of the gaff hooks all as shown in Figures 1 and 4, respectively. When the latter operation (Figure 4) takes place the gaff hooks are driven or impaled in the victim, in an obvious manner, and the catch is virtually assured.

Changes in shape, size, materials and rearrangement of details and parts may be resorted to in actual practice, provided they do not depart from the spirit of the invention or the scope of the appended claims, as is well understood.

Having described the invention, what is claimed as new is:

1. In a fishhook construction of the class shown and described, a coiled spring having a line attaching eye at one end, a trip link attached to the opposite end of said coiled spring, a bait hook attached to said trip link, a pair of gaff hooks, said gaff hooks having portions passing, in crossed relation, through said trip link, and means pivotally mounting corresponding ends of the gaff hooks on said coiled spring.

2. The structure specified in claim 1, wherein said means is in the form of a yoke-like frame.

3. The structure specified in claim 1, wherein said means is in the form of a yoke-like frame and wherein the spring is anchored in the frame and said gaff hooks are hingedly attached to said frame.

4. A fishing hook construction of the class shown and described comprising a coiled spring having a line eye at one end, an elongated link connected to the opposite end of said spring, said link being of general rectangular form and having transverse end portions and being provided at least at one end with a hook assembling eye, a bait hook having a shank passing through said last-named eye and connected to one transverse end portion of said link, a substantially U-shaped frame, said coiled spring being located and mounted in said frame, and a pair of gaff hooks having relatively long limb portions provided at their inner ends with hinging eyes, said hinging eyes being hingedly connected with the sides of said frame, said limbs being criss-crossed and passing in opposite directions through the opening of said link.

LUTHER S. PENNINGER.

REFERENCES CITED

The following references are of record in the file of this patent:

UNITED STATES PATENTS

| Number | Name | Date |
| --- | --- | --- |
| 793,810 | Wangen | July 4, 1905 |
| 801,649 | Coffin | Oct. 10, 1905 |
| 1,175,118 | Binlas | Mar. 14, 1916 |
| 1,238,159 | Lapisch | Aug. 28, 1917 |
| 1,250,053 | Tukey | Dec. 11, 1917 |
| 2,189,496 | Maurer | Feb. 6, 1940 |